US 12,234,845 B1

United States Patent
Leaders et al.

(10) Patent No.: US 12,234,845 B1
(45) Date of Patent: Feb. 25, 2025

(54) POWER CONTROL SYSTEM FOR TRACTION AND IMPLEMENT PUMP MOTORS OF ELECTRIC MACHINE

(71) Applicant: Caterpillar Inc., Peoria, IL (US)

(72) Inventors: Royce E. Leaders, Oswego, IL (US); Alex M. Fullenkamp, Fort Madison, IA (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 18/516,414

(22) Filed: Nov. 21, 2023

(51) Int. Cl.
  F15B 21/08    (2006.01)
  E02F 9/22     (2006.01)
  F15B 11/16    (2006.01)
  E02F 9/20     (2006.01)

(52) U.S. Cl.
  CPC ............ F15B 21/08 (2013.01); E02F 9/2246 (2013.01); F15B 11/16 (2013.01); *B60L 2200/40* (2013.01); *E02F 9/207* (2013.01); *F15B 2211/20515* (2013.01)

(58) Field of Classification Search
  CPC  F15B 21/08; F15B 11/16; F15B 2211/20515; E02F 9/2246; E02F 9/207; B60L 2200/40
  See application file for complete search history.

(56) References Cited

U.S. PATENT DOCUMENTS

| | | | |
|---|---|---|---|
| 5,988,307 A | 11/1999 | Yamada et al. | |
| 7,053,568 B2 | 5/2006 | Rudinec | |
| 7,279,801 B2 * | 10/2007 | Kagoshima | B60L 58/15 290/40 C |
| 7,519,462 B2 * | 4/2009 | Brown | E02F 9/207 701/50 |
| 8,095,285 B2 * | 1/2012 | Schifferer | B60W 30/184 701/50 |
| 8,589,037 B2 * | 11/2013 | Jensen | E02F 9/2087 701/50 |
| 8,666,618 B2 | 3/2014 | Lin et al. | |
| 9,052,013 B2 * | 6/2015 | Landes | F16H 61/0213 |
| 9,139,981 B2 * | 9/2015 | Mitchell | E02F 9/2025 |
| 9,249,557 B2 * | 2/2016 | Moriki | B60L 15/2009 |
| 9,561,788 B2 * | 2/2017 | Ito | E02F 9/2004 |
| 9,976,549 B2 * | 5/2018 | Mueller | H02P 6/10 |
| 10,137,886 B2 | 11/2018 | Mefcy et al. | |
| 10,544,565 B2 * | 1/2020 | Berry | F02D 29/04 |
| 10,697,381 B2 * | 6/2020 | Wilding | F02B 37/10 |

(Continued)

*Primary Examiner* — Dustin T Nguyen
(74) *Attorney, Agent, or Firm* — Leydig, Voit & Mayer, Ltd

(57) ABSTRACT

An electric powertrain for a machine includes an electric power source. The powertrain further includes an implement pump for powering a work implement and an implement pump electric motor. An electric traction motor is operably coupled to a traction device. An electronic controller stores a plurality of rimpull torque curves. The electronic controller is configured to determine if the electric power source is in a power limited condition and upon determining that the electric power source is in a power limited condition act to derate a rimpull torque of the traction device from a first rimpull torque curve of the plurality of rimpull torque curves to a lower second rimpull torque curve of the plurality of rimpull torque curves, wherein the selection of the second rimpull torque curve is based on a power usage by the implement pump electric motor.

20 Claims, 4 Drawing Sheets

(56) References Cited

U.S. PATENT DOCUMENTS

| | | | |
|---|---|---|---|
| 11,038,442 B2 | 6/2021 | Kuras et al. | |
| 11,761,174 B2* | 9/2023 | Legner | B60L 15/20 |
| | | | 701/22 |
| 11,939,745 B2* | 3/2024 | Ishii | E02F 9/2004 |
| 2014/0277884 A1* | 9/2014 | Zhou | B60L 50/10 |
| | | | 701/1 |
| 2015/0197239 A1* | 7/2015 | Vilar | B60K 6/52 |
| | | | 180/65.265 |
| 2023/0097590 A1* | 3/2023 | Andreuccetti | E02F 9/202 |
| | | | 414/722 |
| 2024/0301654 A1* | 9/2024 | Kobayashi | E02F 9/123 |

\* cited by examiner

POWER CONTROL SYSTEM FOR TRACTION AND IMPLEMENT PUMP MOTORS OF ELECTRIC MACHINE

TECHNICAL FIELD

This patent disclosure relates generally to an electric machine having separate traction and implement pump motors and, more particularly, to a system for controlling the distribution of electric power between the two motors.

BACKGROUND

Many machines used in construction and mining environments include a powertrain for actuating both traction devices, for example tires, and a work implement, for example a bucket. More specifically, these powertrains typically include a power source that provides torque through a transmission to one or more of the traction devices of the machine as well as to a pump associated with a hydraulic system that drives movement of the work implement. An internal combustion engine is a commonly used power source in the powertrain of such machines. The powertrain of internal combustion machines generally further includes a multi-speed or continuous variable transmission. With an internal combustion engine powered machine having a multi-speed transmission, the physical connections between the engine, the traction devices and transmission manage the power delivery to the traction devices and the implement pump including arbitrating between the traction devices and implement pump when limited power is available. This management of power delivery to the traction devices and implement pump is handled via controls with a machine having a continuously variable transmission.

Internal combustion engines may emit undesirable exhaust emissions and other pollutants during operation. Moreover, increasing fuel efficiency of machines has also become of increased importance, for example, because of the rising costs associated with fossil fuels. One solution to these issues is a powertrain utilizing an electric motor to provide torque to the traction devices and implement pump of the machine. However, the use of an electric motor in a powertrain of a machine can raise other challenges. For example, operating an electric machine can provide unfamiliar feedback to an operator that is accustomed to operating machines powered by an internal combustion engine.

U.S. Pat. No. 9,139,981 ("the '981 patent"), assigned to the assignee of the present application, describes a system for derating rimpull on a machine that has independent front and rear powertrains and a hydraulic system. The system disclosed in the '981 patent can derate rimpull first from the rear wheels and then from the front wheels when it is determined that a machine implement is being used for operations. The '981 patent, however, fails to appreciate the problems associated with power management and control in an electric powertrain.

SUMMARY

The disclosure describes, in one aspect, an electric powertrain for a machine having a traction device and a work implement. The electric powertrain includes an electric power source and an implement pump for powering the work implement. An electric traction motor is operably coupled to the electric power source for driving the traction device. An implement pump electric motor is operably coupled to the electric power source and the implement pump. An electronic controller stores a plurality of rimpull torque curves. The electronic controller is configured to determine if the electric power source is in a power limited condition. Upon determining that the electric power source is in a power limited condition, the controller acts to derate a rimpull torque of the traction device from a first rimpull torque curve of the plurality of rimpull torque curves to a lower second rimpull torque curve of the plurality of rimpull torque curves, with the selection of the second rimpull torque curve being based on a power usage by the implement pump electric motor.

In another aspect, the disclosure describes a machine including a machine frame, a traction device supported on the machine frame, and a work implement supported on the machine frame. An electric powertrain is supported on the machine frame for driving the traction device and powering the work implement. The electric powertrain includes an electric power source, an implement pump for powering the work implement, an electric traction motor operably coupled to the electric power source for driving the traction device and an implement pump electric motor operably coupled to the electric power source and the implement pump. An electronic controller stores a plurality of rimpull torque curves. The electronic controller is configured to determine if the electric power source is in a power limited condition. Upon determining that the electric power source is in a power limited condition, the controller acts to derate a rimpull torque of the traction device from a first rimpull torque curve of the plurality of rimpull torque curves to a lower second rimpull torque curve of the plurality of rimpull torque curves, with the selection of the second rimpull torque curve being based on a power usage by the implement pump electric motor.

In yet another aspect, the disclosure describes a method for controlling an electric powertrain of a machine. The electric powertrain includes an electric power source, an implement pump for powering a work implement, an electric traction motor for driving the traction device, and an implement pump electric motor. The method includes determining if the electric power source is in a power limited condition. Upon determining that the electric power source is in a power limited condition, the method includes acting to derate a rimpull torque of the traction device from a first rimpull torque curve of a plurality of rimpull torque curves to a lower second rimpull torque curve of the plurality of rimpull torque curves. The selection of the second rimpull torque curve is based on a power usage by the implement pump electric motor.

DETAILED DESCRIPTION

Figure 1:
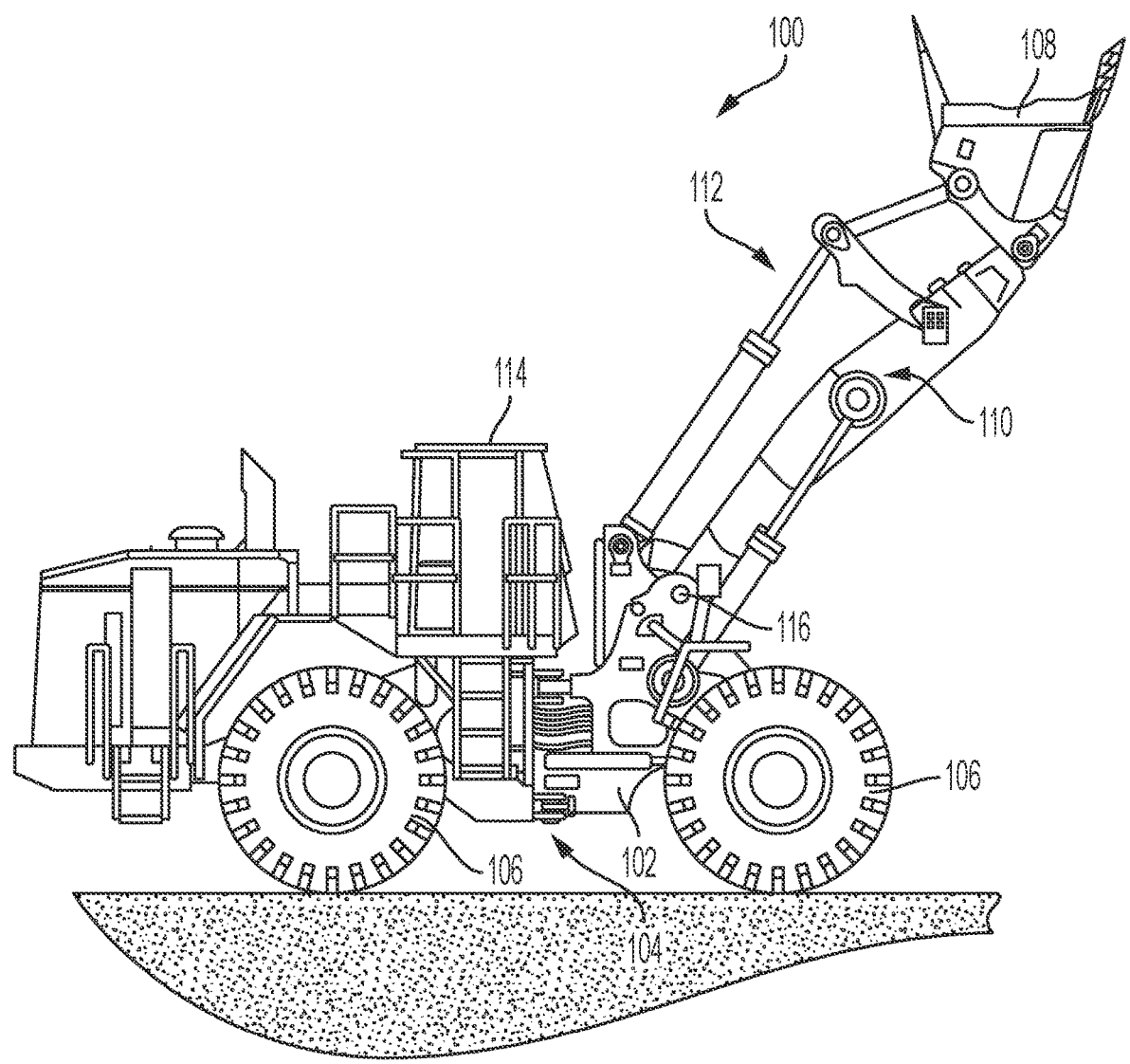
FIG. 1 is a side elevation view of an exemplary machine having a power control system according to the present disclosure.

Now referring to the drawings, wherein whenever possible like reference numbers will refer to like elements, there is illustrated in FIG. 1 a mobile machine 100 in the particular embodiment of a wheel loader for, in this case, loading, transporting, and delivering material about a worksite. However, while the present disclosure focuses on a mobile machine 100 in the embodiment of a wheel loader, aspects of the disclosure may be applicable to other types of mobile machines that perform some type of operation in association with an industry such as mining, construction, farming, transportation or the like.

In the illustrated embodiment, the machine 100 includes a machine frame 102. To facilitate maneuverability such as making sharp turns, the machine frame 102 may be an articulated frame wherein the forward end and the rearward end are pivotally joined at an articulated joint 104. To enable the machine 100 to move about a work surface in a mobile manner, the machine frame 102 can be supported on a plurality of traction devices 106 such as rotatable wheels that can include rubber tires. The wheels may be designated as powered drive wheels to propel the machine 100, steerable wheels to adjust direction of the wheel loader, or combinations thereof. Other suitable embodiments of machines may include different traction devices 106 such as continuous tracks that include a closed belt disposed about rollers and/or sprockets, whereby translation of the belt carries the machine over the work surface.

To perform a work-related task during operation, the machine 100 can include a work implement 108, a bucket in the illustrated embodiment, that in this case is operatively associated with a lifting mechanism 110 that can vertically raise and lower the work implement 108 with respect to a work surface. The lifting mechanism 110 can be a mechanical linkage assembled from a plurality of rigid links connected by pivotal joints that can articulate and move with respect to each other to controllably displace or reposition the work implement 108. In particular, the work implement 108 can be pivotally disposed at the distal end of the lifting mechanism 110 which in turn may be pivotally connected (via pivot joint 116) to the forward end of the machine frame 102. A tilt mechanism 112 may also be provided to pivot the work implement 108 relative to the lift mechanism 110. In other embodiments of mobile machines, it will be appreciated that the work implement 108 may be different than a bucket such as, for example, a fork, a blade, a drilling auger, and the like.

The work implement 108 may have an associated hydraulic system 115 (see FIG. 2) that provides pressurized hydraulic fluid that operates the work implement 108. In this case, the hydraulic system 115 may provide pressurized hydraulic fluid to the lift and tilt mechanisms 110, 112 associated with the work implement 108. To this end the machine hydraulic system may include an implement pump 117 (see FIG. 2) having an outlet port through which fluid is provided to the hydraulic system 115. In some embodiments, the implement pump 117 may also power other machine systems such as the brake system, steering system and the transmission lubrication system.

In an embodiment, to accommodate an operator and/or the operator input devices or controls for operation of the machine, the machine 100 can include an onboard operator cab 114. For example, the input devices in the operator cab 114 can include travel inputs that control mobile travel of the machine 100 and lift inputs that can manipulate the work implement 108. Examples of travel inputs and lift inputs can include hand wheels, joysticks, pedals, levers, knobs, keypads, etc. The travel inputs can be configured to increase or decrease the travel velocity of the machine 100 with respect to the travel direction to speedup, slow, and/or stop travel of the machine.

Figure 2:
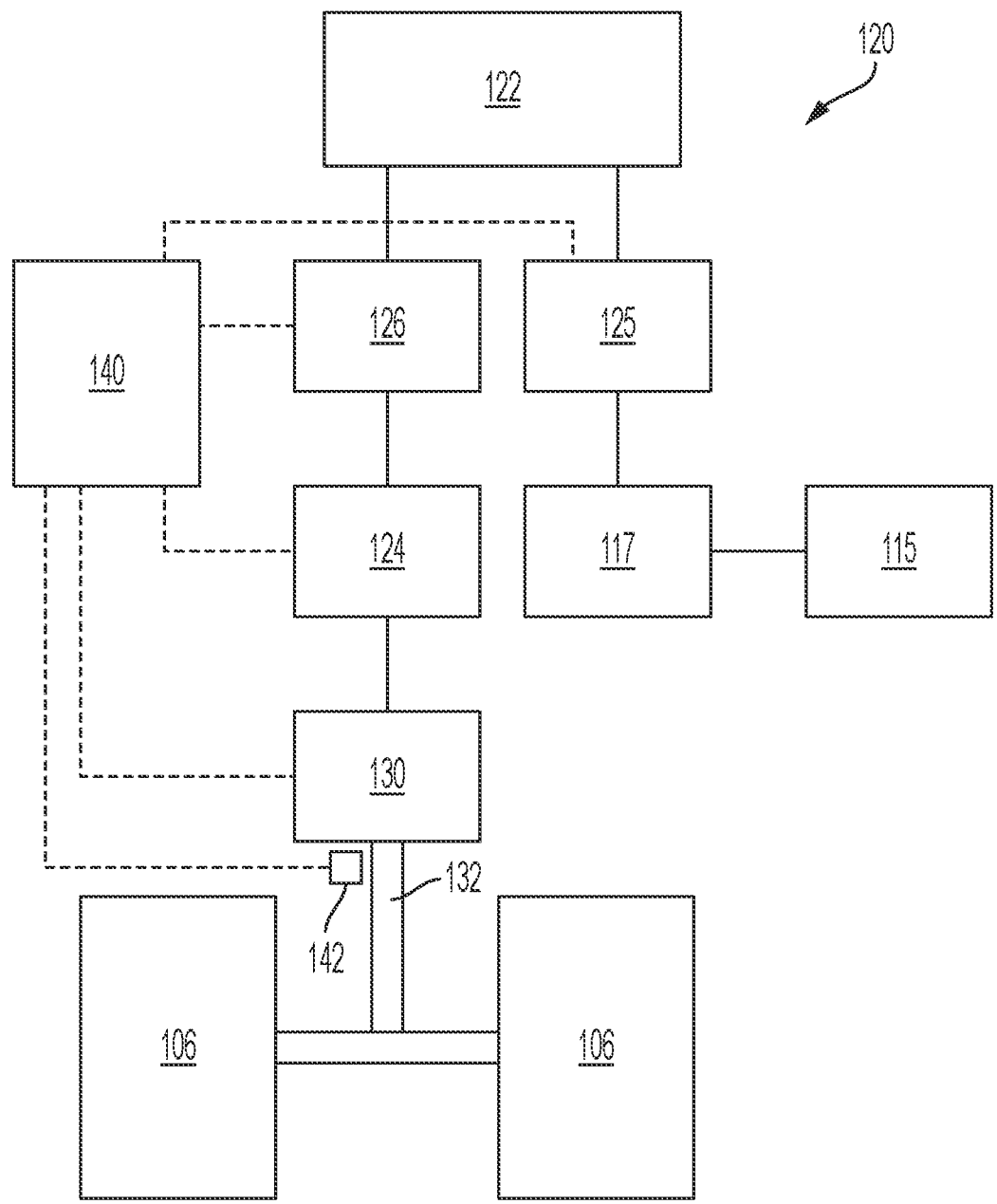
FIG. 2 is a schematic diagram of an electric powertrain for the machine of FIG. 1.

Referring to FIG. 2, for providing power to one or more of the traction devices 106 and the implement pump 117, the machine 100 includes an electric powertrain 120. The illustrated electric powertrain 120 includes an electric power source 122, which can comprise, for example, a battery pack supported on the machine frame 102. The battery pack may include one or more rechargeable batteries that store electric energy, which may be used to drive operation of the electric powertrain 120 of the machine 100. In other embodiments, the electric power source 122 may utilize electricity supplied from, for example, an internal combustion engine operating in series with an associated electric generator, or a fuel cell.

The electric powertrain 120 further includes an electric traction motor 124 also supported on the machine frame 102 for powering the traction devices and an implement pump electric motor 125 also supported on the machine frame for powering the implement pump 117. In particular, the electric powertrain 120 may be configured such that the electric power source 122 provides electric energy to power the electric traction motor 124 and the implement pump electric motor 125. Although referred to in the singular, more than one electric motor may be used for both the traction motor and the implement pump motor such as, for example, two or more electric motors mechanically combined via a gear or gear train. The electric traction motor 124 and the implement pump electric motor 125 may be any known AC or DC motor such as, permanent magnet, induction, switched-reluctance, or a hybrid configuration of the above, and may also be sealed, brushless, and/or liquid-cooled. Furthermore, in some embodiments, the electric traction motor 124 may be configured and controlled such that the machine 100 may be slowed while using the electric traction motor 124 as a generator, thereby converting kinetic energy associated with the wheel loader into electric energy that may be stored in the electric power source 122 or other electric power storage device.

In the illustrated embodiment, the electric traction motor 124 has an associated inverter 126 that is configured to convert and control electricity supplied to the electric traction motor 124 by the electric power source 122. For example, the inverter 126 may be configured to control the frequency of the electric power supplied to the electric traction motor 124 to thereby control the rotation speed and output torque of the motor.

To further adjust the speed and or torque produced by the electric traction motor 124, the electric powertrain 120 can include a multi-speed transmission 130. More specifically the multi-speed transmission 130 may include a geartrain or gearbox supported on the machine frame 102 that facilitates regulation and transfer of power generated by the electric traction motor 124 to the traction devices 106 of the machine 100. The multi-speed transmission 130 may be adapted to be operably coupled to the electric traction motor 124. Such coupling may be exemplarily attained by selective use of one or more clutches, such as a forward travel clutch and a reverse travel clutch. Like the power source 122, electric traction motor 124 and implement pump electric motor 125, the multi-speed transmission 130 may be supported on the machine frame 102.

The multi-speed transmission 130 may define multiple distinct gear ranges that may enable the machine 100 to attain motion in both the forward direction and reverse direction. For example, the multi-speed transmission 130 may be configured to adjust the output speed and torque from the electric traction motor 124 to multiple ranges or settings such as two, three, four or more forward output speed and torque ranges and one rearward speed and torque range. The multi-speed transmission 130 may also include a transmission output shaft 132 through which power output (e.g., rotary power output) received from the electric traction motor 124 may be delivered to further components of the electric powertrain 120.

To facilitate controlled operation of the electric powertrain 120, the electric powertrain 120 can be operatively associated with a control system embodied in an electronic controller 140, sometimes referred to as an electronic control module (ECM) or an electronic control unit (ECU). The electronic controller 140 can be a programmable computing device and can include one or more microprocessors for executing software instructions and processing computer readable data. Examples of suitable microprocessors include programmable logic devices such as field programmable gate arrays ("FPGA"), dedicated or customized logic devices such as application specific integrated circuits ("ASIC"), gate arrays, a complex programmable logic device, or any other suitable type of circuitry or microchip. To store application software and data for the controlled operation of the electric powertrain, the electronic controller 140 can include a non-transitory computer readable and/or writeable memory, for example, read only memory ("ROM"), random access memory ("RAM"), EPROM memory, flash memory, or another more permanent storage medium like magnetic or optical storage. To interface and network with other operational systems on the machine 100, the electronic controller 140 can include an input/output interface to electronically send and receive non-transitory data and information. The input/output interface can be physically embodied as data ports, serial ports, parallel ports, USB ports, jacks, and the like to communicate via conductive wires, cables, optical fibers, or other communicative bus systems via any suitable communication protocol such as CAN Bus, WiFi, Bluetooth, or cellular communication standards. The electronic controller 140 may be associated with other software including any suitable instruction sets, programs, applications, routines, libraries, databases and the like, for carrying out its functions. Although in FIG. 2, the electronic controller 140 is illustrated as a single, discrete unit, in other embodiments, the electronic controller 140 and its functions may be distributed among a plurality of distinct and separate components, including various components and functionalities located onboard the machine 100 and/or at an off-board operator station.

In this case, the electronic controller 140 may be in communication with the inverter 126, the electric traction motor 124, the multi-speed transmission 130 and the implement pump electric motor 125. The data lines of the electronic communications network between the electronic controller 140 and these systems of the electric powertrain 120 are represented by dashed lines in FIG. 2 and may be embodied as a CAN bus or similar protocols and may utilize conductive wires or fiber optics as the physical transmission media.

The electronic controller 140 may be configured to arbitrate how much power is consumed between the electric traction motor 124 and the implement pump electric motor 125 during certain operating conditions when the electric power source 122 is in a power constrained condition, i.e. when the electric power source 122 has limited available power. In such operating conditions, the combined power usage of the electric traction motor 124 and the implement pump electric motor 125 exceeds a predetermined threshold power level. To this end, the controller 140 may be configured to monitor the present electric traction motor power usage and the present electric implement pump motor power usage. For example, the electric traction motor power usage may be monitored via a sensor 142 arranged to monitor the speed of the output shaft 132 of the multi-speed transmission 130 and in communication with the electronic controller 140, while the implement pump electric motor power usage may be monitored by the electronic controller 140 via feedback signals from the implement pump electric motor 125.

According to some embodiments, the predetermined threshold power level may be based on a percentage of the maximum power output of the electric power source 122 at a particular time and operating conditions. More specifically, the predetermined threshold power level may be at or near the maximum power output of the electric power source 122 at a given time. Alternatively, the predetermined power threshold may be based on remaining or available electric power from the electric power source 122. In other words, when the power usage of the electric traction motor 124 and the implement pump electric motor 125 would leave the electric power source 122 with less than a predetermined amount of available power, the power demand may be considered to exceed the predetermined threshold. In such situations, the available power output from the electric power source 122 is in a limited or constrained condition and the electronic controller 140 is called upon to determine how power from the electric power source 122 should be distributed among the electric traction motor 124 and the implement pump electric motor 125. In particular, it may be necessary for the controller to direct less power to the electric traction motor 124 than demanded by an operator when available power is limited in order to ensure that the power delivered to the implement pump electric motor 125 is at or near the level demanded by the operator. In such a case, the electronic controller 140 prioritizes power delivery to the implement pump electric motor 125 over power delivery to the electric traction motor 124.

Figure 3:
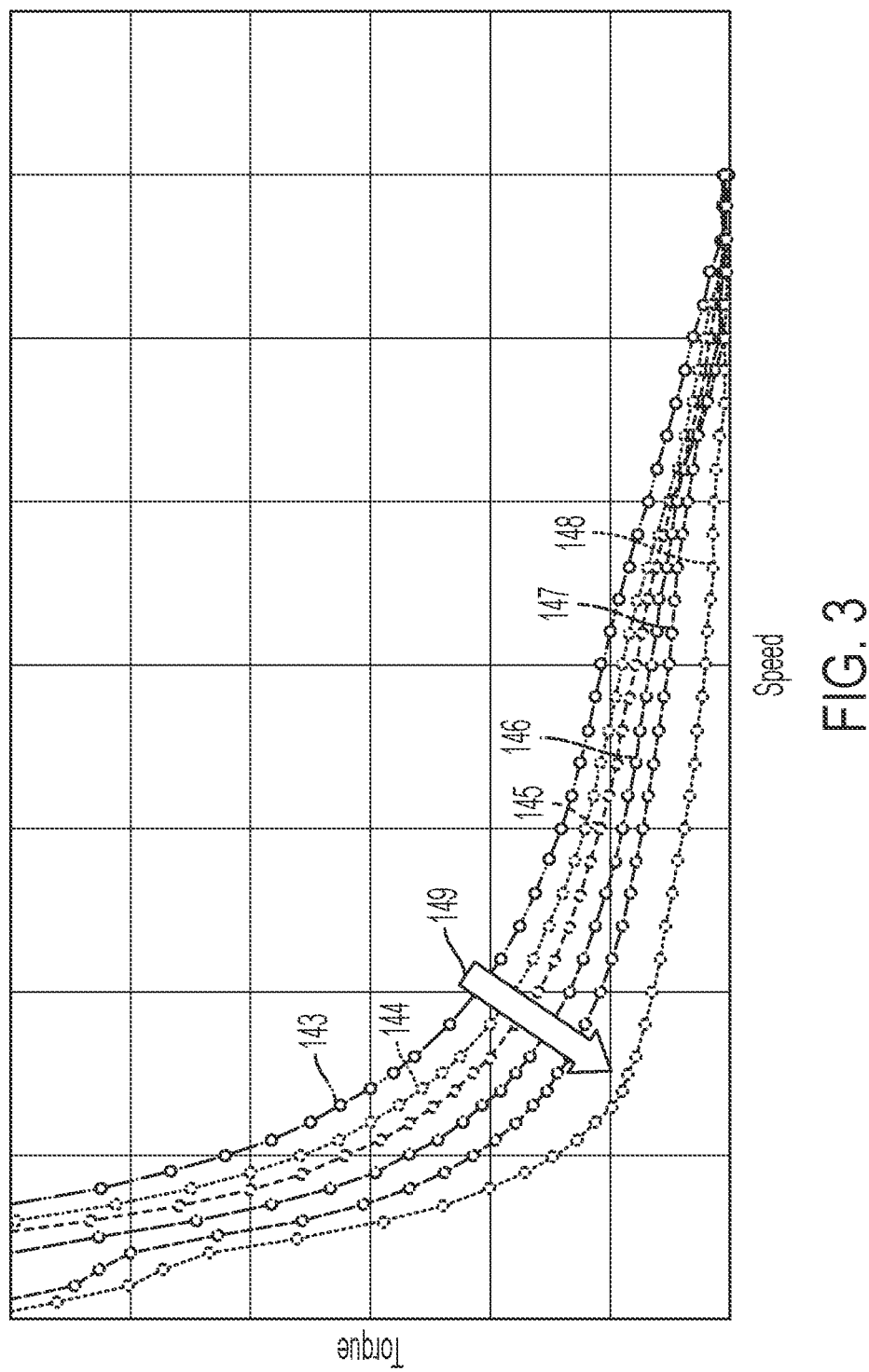
FIG. 3 is a plot of transmission output speed versus rimpull torque for traction motor and transmission of the electric powertrain of FIG. 1 including multiple exemplary derated rimpull torque curves according to the present disclosure.

To assist the electronic controller 140 in determining how to split the electric power between the electric traction motor 124 and the implement pump electric motor 125, the electronic controller 140 may be configured with a plurality of rimpull curves. FIG. 3 provides an exemplary plot of the multi-speed transmission 130 output speed versus rimpull torque that includes a plurality of rimpull torque curves 143, 144, 145, 146, 147 and 148. Each rimpull curve provides a potential transmission output speed versus rimpull torque response that can be achieved at the traction devices via the electric traction motor 124 operating through the multi-speed transmission 130 depending on the amount of electric power available from the electric power source 122 and the demanded power of the implement pump electric motor 125.

In this case, the outermost rimpull curve 143 represents the rimpull curve that is used during normal operation, i.e., when there is sufficient power available from the electric power source 122 to operate the electric traction motor 125 normally (i.e., when the electric power source 122 is not in a power constrained condition). However, when the electric power source 122 is in a constrained condition such as when the combined power usage of the electric traction motor 124 and the implement pump electric motor 125 exceeds the predetermined power level, the electronic controller 140 may be configured to reduce power to the electric traction motor 124 by switching the electric traction motor 124 and multi-speed transmission 130 to a lower or derated rimpull torque curve 144, 145, 146, 147 or 148 below the current rimpull torque curve (e.g., 143) in order to provide the demanded power to the implement pump electric motor 125. The derated rimpull curve 144, 145, 146, 147 or 148 allows the electric traction motor 124 to consume less electric power from the electric power source 122 leaving more power available for the implement pump electric motor 125. Moreover, as an operator demands more power for the implement pump electric motor 125, the controller will derate then rimpull torque at the traction devices to successively lower rimpull curves 145, 146, 147 or 148 in order to further reduce the power consumption by the electric traction motor 124 thereby making more power available to the implement pump electric motor 125. In FIG. 3, the derating direction with increasing implement pump electric motor is power is represented by the arrow 149. In the embodiment illustrated in FIG. 3, there are a total of six rimpull curves 143, 144, 145, 146, 147 and 148 that are stored in the electronic controller 140. However, in other embodiments, the electronic controller 140 may be provided with more or fewer rimpull torque curves.

INDUSTRIAL APPLICABILITY

The present disclosure is applicable to any type of electric powertrain that powers both an electric traction motor and an implement pump electric motor. Accordingly, the present disclosure is applicable to a wide variety of machines that have both the capability of moving about a work site while performing some sort of operation with a work implement. Moreover, the plurality of rimpull curves 143, 144, 145, 146, 147 and 148 stored and utilized by the electronic controller may be configured to provide an operator of the machine 100 the feel of a powertrain powered by an internal combustion engine, such as a diesel engine. In particular, the use of a series of successively derated rimpull curves 143, 144, 145, 146, 147 and 148 and the shapes of the individual curves may be designed so as allow the electric powertrain 120 to mimic the performance and feel to an operator of a diesel engine powered machine under the same or substantially similar operating conditions, i.e. when the diesel engine powered machine is operating in a power limited or power constrained condition. Providing the operator with a familiar operating feel can improve operating performance and acceptance of electrically powered machines.

Figure 4:
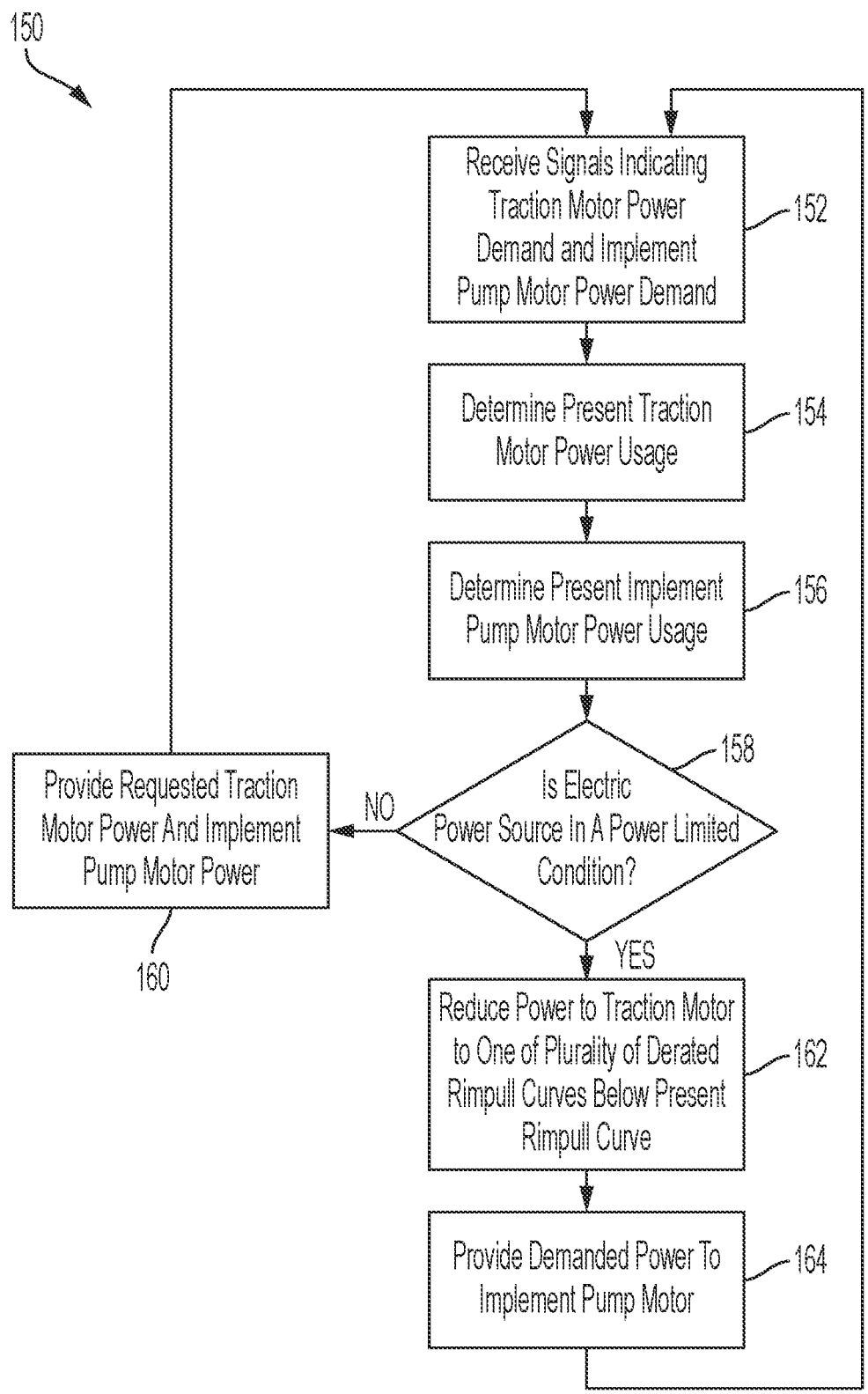
FIG. 4 is a flow chart illustrating an exemplary process for controlling the electric powertrain of FIG. 2.

Referring to FIG. 4 and in general accordance with the prior figures, there is illustrated an exemplary process 150 for controlling the distribution of electric power to the electric traction motor 124 and the implement pump electric motor 125 in a machine 100 with an electric powertrain 120 that may be executed by the electronic controller 140. As noted above, the disclosed process has particular applicability to situations in which the electric power source 122 is in a power constrained condition. The process depicted in the flow diagram of FIG. 4 for accomplishing these tasks may include a series of steps or instruction implemented as non-transitory computer executable software code in the form of an application or program that is run by the electronic controller 140.

In step 152 of the process 150, the electronic controller 140 receives signals indicating a traction electric motor power demand and an implement pump electric motor demand. For example, these demands may be initiated by an operator of the machine 100 such as through input devices provided in the operator cab 114. In step 154, the electronic controller 140 determines the present electric traction motor power usage. This may be determined, at least in part, by using signals from the transmission output speed sensor 142 which communicates with the electronic controller 140. In step 156, the electronic controller 140 determines the present implement pump power usage. The electronic controller 140 may determine the implement pump power usage, at least in part, using feedback signals from the implement pump electric motor 125.

In step 158, the electronic controller 140 determines if the electric power source 122 is in a power constrained condition. This can be accomplished using the determinations of the present traction motor power usage from step 154 and the determination of the present implement pump motor power usage from step 156. If the electronic controller 140 determines that the electric power supply 122 is in a power constrained state, the electronic controller 140 directs the electric powertrain 120 to provide the demanded electric traction motor power and implement pump electric motor power in step 160. If the electric power supply 122 is in a power constrained condition, in step 162, the electronic controller 140 derates the rimpull torque at the traction devices 106 using one of a plurality of derated rimpull curves 144, 145, 146, 147 or 148 below the present rimpull curve and thereby reduces power to the electric traction motor 124. As noted above, the selection of the derated rimpull torque curve 144, 145, 146, 147 or 148 will depend on the implement pump motor demand, with successively lower rimpull torque curves being selected as the implement pump electric motor power demand increases. This reduction in power to the electric traction motor 124 allows the controller to direct the demanded power to the implement pump electric motor 125 in step 164.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or "one or more of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An electric powertrain for a machine having a traction device and a work implement, the electric powertrain comprising:
    an electric power source;
    an implement pump for powering the work implement;
    an electric traction motor operably coupled to the electric power source for driving the traction device;
    an implement pump electric motor operably coupled to the electric power source and the implement pump; and
    an electronic controller that stores a plurality of rimpull torque curves, the electronic controller configured to:
        determine if the electric power source is in a power limited condition; and
        upon determining that the electric power source is in a power limited condition acting to derate a rimpull torque of the traction device from a first rimpull torque curve of the plurality of rimpull torque curves to a lower second rimpull torque curve of the plurality of rimpull torque curves, wherein the selection of the second rimpull torque curve is based on a power usage by the implement pump electric motor.

2. The electric powertrain of claim 1, wherein the electric power source is a battery pack.

3. The electric powertrain of claim 1, further including a multi-speed transmission operably coupled to the electric traction motor and having an output shaft operably coupled to the traction device.

4. The electric powertrain of claim 3, further including a sensor arranged to sense the speed of the output shaft of the multi-speed transmission.

5. The electric powertrain of claim 4, wherein the electronic controller is in communication with the electric traction motor, the implement pump electric motor, the multi-speed transmission and the sensor.

6. The electric powertrain of claim 5, wherein the electronic controller determines if the electric power source is in the power limited condition based on signals from the sensor and feedback signals from the implement pump electric motor.

7. The electric powertrain of claim 1, wherein the electronic controller determines that the electric power source is in the power limited condition when power being consumed by the electric traction motor and the implement pump electric motor exceeds a predetermined level.

8. The electric powertrain of claim 1, wherein the electronic controller selects the second rimpull torque curve based on being able to provide a full demanded power to the implement pump electric motor.

9. A machine comprising:
    a machine frame;
    a traction device supported on the machine frame;
    a work implement supported on the machine frame; and
    an electric powertrain supported on the machine frame for driving the traction device and powering the work implement, the electric powertrain comprising:
        an electric power source;
        an implement pump for powering the work implement;
        an electric traction motor operably coupled to the electric power source for driving the traction device;
        an implement pump electric motor operably coupled to the electric power source and the implement pump; and
        an electronic controller that stores a plurality of rimpull torque curves, the electronic controller configured to:
            determine if the electric power source is in a power limited condition; and
            upon determining that the electric power source is in a power limited condition acting to derate a rimpull torque of the traction device from a first rimpull torque curve of the plurality of rimpull torque curves to a lower second rimpull torque curve of the plurality of rimpull torque curves, wherein the selection of the second rimpull torque curve is based on a power usage by the implement pump electric motor.

10. The machine of claim 9, wherein the electric power source is a battery pack.

11. The machine of claim 9, further including a multi-speed transmission operably coupled to the electric traction motor and having an output shaft operably coupled to the traction device.

12. The machine of claim 11, further including a sensor arranged to sense the speed of the output shaft of the multi-speed transmission.

13. The machine of claim 12, wherein the electronic controller is in communication with the electric traction motor, the implement pump electric motor, the multi-speed transmission and the sensor.

14. The machine of claim 13, wherein the electronic controller determines if the electric power source is in the power limited condition based on signals from the sensor and feedback signals from the implement pump electric motor.

15. The machine of claim 9, wherein the electronic controller determines that the electric power source is in the power limited condition when power being consumed by the electric traction motor and the implement pump electric motor exceeds a predetermined level.

16. The machine of claim 9, wherein the electronic controller selects the second rimpull torque curve based on being able to provide a full demanded power to the implement pump electric motor.

17. A method for controlling an electric powertrain of a machine, the electric powertrain including an electric power source, an implement pump for powering a work implement, an electric traction motor for driving the traction device, an implement pump electric motor; the method comprising:
    determining if the electric power source is in a power limited condition; and
    upon determining that the electric power source is in a power limited condition, acting to derate a rimpull torque of the traction device from a first rimpull torque curve of a plurality of rimpull torque curves to a lower second rimpull torque curve of the plurality of rimpull torque curves;
    wherein the selection of the second rimpull torque curve is based on a power usage by the implement pump electric motor.

18. The method according to claim 17, wherein the step of determining if the electric power source is in the power limited condition is based on signals from a sensor monitoring an output speed of a transmission and feedback signals from the implement pump electric motor.

19. The method according to claim 17, wherein the step of determining if the electric power source is in the power limited condition comprises determining when power being consumed by the electric traction motor and the implement pump electric motor exceeds a predetermined level.

20. The method according to claim 17, wherein the second rimpull torque curve is selected based on being able to provide a full demanded power to the implement pump electric motor.

* * * * *